(12) United States Patent
Popat et al.

(10) Patent No.: US 9,216,919 B2
(45) Date of Patent: Dec. 22, 2015

(54) MICROBIAL ELECTROLYSIS CELLS AND METHODS FOR THE PRODUCTION OF CHEMICAL PRODUCTS

(71) Applicant: Arizona Science and Technology Enterprises LLC, Scottsdale, AZ (US)

(72) Inventors: Sudeep Popat, Chandler, AZ (US); Prathap Parameswaran, Tempe, AZ (US); Cesar Torres, Tempe, AZ (US); Bruce Rittmann, Tempe, AZ (US)

(73) Assignee: Arizona Science and Technology Enterprises LLC, Scottsdale, AZ (US)

( * ) Notice: Subject to any disclaimer, the term of this patent is extended or adjusted under 35 U.S.C. 154(b) by 221 days.

(21) Appl. No.: 13/839,154

(22) Filed: Mar. 15, 2013

(65) Prior Publication Data

US 2013/0256149 A1 Oct. 3, 2013

Related U.S. Application Data

(60) Provisional application No. 61/616,893, filed on Mar. 28, 2012.

(51) Int. Cl.
| | |
|---|---|
| *C02F 3/02* | (2006.01) |
| *C25B 1/10* | (2006.01) |
| *C25B 11/02* | (2006.01) |
| *C02F 3/00* | (2006.01) |
| *C25B 9/08* | (2006.01) |
| *C02F 1/461* | (2006.01) |

(52) U.S. Cl.
CPC . *C02F 3/005* (2013.01); *C25B 1/10* (2013.01); *C25B 9/08* (2013.01); *C25B 11/02* (2013.01); *C02F 2001/46133* (2013.01); *C02F 2001/46157* (2013.01); *C02F 2201/4619* (2013.01); *C02F 2201/46115* (2013.01); *Y02E 60/366* (2013.01)

(58) Field of Classification Search
None
See application file for complete search history.

(56) References Cited

U.S. PATENT DOCUMENTS

| | | | |
|---|---|---|---|
| 7,491,453 | B2 | 2/2009 | Logan et al. |
| 7,922,878 | B2 | 4/2011 | Logan |
| 2007/0042480 | A1 | 2/2007 | Rozendal et al. |
| 2007/0259217 | A1 | 11/2007 | Logan |
| 2008/0292912 | A1 | 11/2008 | Logan et al. |

(Continued)

FOREIGN PATENT DOCUMENTS

WO    WO 2010/147683 A1 * 12/2010

OTHER PUBLICATIONS

Lee et al, Biological hydrogen production: prospects and challenges, Trends in Biotechnology, vol. 28, No. 5, May 2010, pp. 262-271.*
Logan et al, Graphite Fiber Brush Anodes for Increased Power Porduction in Air-Cathode Microbial Fuel Cells, Environmental Science & Technology, vol. 41, No. 9, Mar. 2007, pp. 3341-3346.*

(Continued)

*Primary Examiner* — Harry D Wilkins, III
(74) *Attorney, Agent, or Firm* — Marsh Fischmann & Breyfogle LLP

(57) ABSTRACT

A microbial electrolysis cell having a brush anode is described. A method of producing products, such as hydrogen, at the cathode of the microbial electrolysis cell is also provided. The microbial electrolysis cell is configured in a cylindrical shape having an anode, cathode and anion exchange membrane all disposed concentrically. A brush anode spirally wound around the outside of the cylindrical microbial electrolysis cell is described. The method may include sparging the anode and/or cathode with air in some cases. In addition, $CO_2$-containing gas may be injected into a cathode chamber to reduce pH is some cases.

12 Claims, 7 Drawing Sheets

(56) References Cited

U.S. PATENT DOCUMENTS

| | | |
|---|---|---|
| 2010/0119920 A1 | 5/2010 | Logan et al. |
| 2011/0315560 A1 | 12/2011 | Rabaey et al. |
| 2011/0315561 A1 | 12/2011 | Rabaey et al. |
| 2011/0318610 A1 | 12/2011 | Rabaey et al. |

OTHER PUBLICATIONS

Jeremiasse et al, Ni foam cathode enables high volumetric $H2$ production in a microbial electrolysis cell, International Journal of Hydrogen Energy, vol. 35, No. 23, Dec. 2010, pp. 12716-12723.*

* cited by examiner

MICROBIAL ELECTROLYSIS CELLS AND METHODS FOR THE PRODUCTION OF CHEMICAL PRODUCTS

CROSS REFERENCE TO RELATED APPLICATIONS

This application claims priority to U.S. Provisional Application No. 61/616,893, filed Mar. 28, 2012, entitled "MICROBIAL ELECTROLYSIS CELLS AND METHODS FOR THE PRODUCTION OF CHEMICAL PRODUCTS", which is incorporated herein by reference in its entirety.

FIELD

This disclosure relates to the field of Microbial Electrolysis Cells (MECs), including MECs that may be utilized to produce useful chemical products, such as hydrogen gas or caustic soda.

BACKGROUND

Wastewater from industrial and domestic sources typically contains dissolved organics that need to be removed before the water can be reused. Traditionally, this has been done by aerobic biological treatment. However, this treatment method requires aeration, which consumes large amounts of energy and thus it is an energy intensive process.

Although wastewater is typically thought of as a nuisance, it is being increasingly recognized as a resource for the production of energy, fuels, and chemicals. While anaerobic digestion has already developed into a mature technology for conversion of wastewater organics to the energetic gas methane ($CH_4$), not all of the energy extracted from wastewater is available for use, as there are significant losses associated with the conversion of methane to easily usable energy forms such as electricity.

Recently, a new technology referred to as Microbial Electrolysis Cells (MEC) has gained significant attention with respect to sustainable wastewater treatment. This technology relies on specialized bacteria called anode-respiring bacteria (ARB) that oxidize wastewater organics and transfer electrons thus extracted to an anode. These electrons move through a circuit to a cathode, where water ($H_2O$) is reduced to produce hydrogen ($H_2$) gas by applying additional voltage. The MEC is especially attractive since the produced $H_2$ gas has higher energetic value than $CH_4$ gas, can be readily converted to useful electrical power using chemical fuel cells, and is a major feedstock to the chemical and petrochemical industries. Other chemical products may be produced, such as caustic soda (NaOH), which is useful in the manufacture of pulp and paper, textiles, soaps and detergents.

SUMMARY

A general schematic illustration of an MEC is shown in FIG. 1. The MEC 100 includes an anode chamber 112 and a cathode chamber 114 that are separated by a membrane 106. An anode 102 is disposed in the anode chamber 112. The anode 102 includes anode-respiring bacteria 108 disposed on the surface of the anode 102. A cathode 104 is disposed in the cathode chamber 114. In operation, organics dissolved within an anode solution 118 (e.g., wastewater) are oxidized by the anode-respiring bacteria 108. The oxidized organics release electrons which are transported to the anode 102. Concurrently, $H_2O$ in the cathode solution 120 is reduced to $H_2$ at the cathode 104, and hydroxyl ions ($OH^-$) are transported through the membrane 106 to the anode 102. The reactions may be driven by a power source 110 (e.g., a DC voltage power source) that is operatively connected (e.g., electrically) to the anode 102 and the cathode 104.

Practical application of MECs hinges on the ability to achieve high current densities within the MEC at low applied voltages, so that high rates of wastewater treatment and $H_2$ production can be obtained with reduced MEC energy input. Theoretically, a potential of about 0.14 V must be applied to the MEC to produce $H_2$; however, practical applied voltages in laboratory systems are greater, since losses of potential occur in MECs due to activation losses at both the anode and the cathode, and Ohmic losses occur that depend upon the nature of the electrolyte used to separate the electrodes, as well as on the separation distance between the electrodes.

ARB produce maximum current densities in the range of 10 $A/m^2$ (amps per square meter of the anode), with anode-potential losses of 0.1 to 0.2 V. This loss of potential is the energy that ARB derive for their growth, and thus is unavoidable. For the cathodic $H_2$-evolution reaction, various metal catalysts can be used to decrease losses of potential, and the activation loss for the reaction depends on the nature of the metal catalyst.

The conductivity of the anode and cathode solutions and the nature of the membrane used to separate the two electrodes govern the Ohmic losses, which scale linearly with the separation distance between the anode and the cathode. Wastewaters are typically of poor ionic conductivity; thus, it is important to place the anode and the cathode very close to each other to minimize Ohmic losses. Anion exchange membranes (AEM) may be a better alternative to cation exchange membranes (OEM) for separating the anode and the cathode, because of their low resistance, e.g., to ion transport. In principle, the membrane could be entirely excluded, but removing the membrane requires increasing the distance between the anode and the cathode to avoid $H_2$ short-circuiting, thus increasing Ohmic losses.

Thus, in one embodiment, a microbial electrolysis cell is provided. The microbial electrolysis cell includes a high surface-area brush anode, a cathode, a power source operatively connected to the brush anode and the cathode, an anion exchange membrane separating the brush anode from the cathode and a reaction chamber containing the brush anode, the cathode and the anion exchange membrane. The anion exchange membrane operatively separates the reaction chamber into an anode chamber containing the brush anode and a cathode chamber containing the cathode. The brush anode and the cathode are separated by a separation distance that is not greater than about 1.5 cm.

According to one configuration, the brush anode comprises a plurality of brush fibers emanating from a conductive wire disposed approximately through the center of the anode, where the brush fibers comprise carbon fibers and the conductive wire comprises stainless steel. In another configuration, the cathode comprises a metal foam. For example, the metal foam may be characterized as having a thickness of not greater than about 5 mm. The cathode may also be characterized as comprising nickel metal foam.

In another configuration, the separation distance between the brush anode and the cathode is not greater than about 1.25 cm. In another characterization, the brush anode has a thickness of not greater than about 2.0 cm. In yet another characterization, the brush anode has a length, where the brush anode is in direct physical contact with the anion exchange membrane along at least a portion of its length. In another characterization, the cathode is in direct physical contact with the anion exchange membrane.

In one configuration, the brush anode, the cathode and the anion exchange membrane comprise substantially cylindrical bodies that are disposed in a substantially concentric relationship in a cylindrical electrolysis cell. In one characterization, the anode is disposed on the outside of the cylindrical electrolysis cell. In another characterization, the anode comprises a brush anode that is wound into a cylindrical body. In another characterization, the anode having a brush comprising a plurality of brush fibers emanating from a conductive wire, wherein the brush anode is spirally wound into a cylindrical body.

In another embodiment, a multi-module microbial electrolysis cell treatment apparatus is provided. The apparatus includes a treatment tank having an inlet for influent and an outlet for effluent, and a plurality of cylindrical microbial electrolysis cells operatively disposed within the treatment tank. The microbial electrolysis cells comprise a high surface-area brush anode, a cathode, a power source operatively connected to the brush anode and the cathode and an anion exchange membrane separating the brush anode from the cathode. Advantageously, the brush anode, the cathode and the anion exchange membrane comprise substantially cylindrical bodies that are disposed in a substantially concentric relationship to form the cylindrical microbial electrolysis cells, where the anion exchange membrane operatively separates the influent from the effluent in the treatment tank.

In one characterization of the apparatus, the brush anodes are disposed on the outside of the cylindrical electrolysis cells.

In yet another embodiment, a method for the production of $H_2$ from a fluid stream comprising organic matter in a microbial electrolysis cell is provided. The method comprises the steps of providing at least one microbial electrolysis cell, the cell comprising an anode disposed in an anode chamber, a cathode disposed in a cathode chamber, a power source operatively connected to the anode and the cathode, and an anion exchange membrane separating the anode and the cathode. The fluid stream is contacted with anode-respiring bacteria disposed on the anode, and the cathode is contacted with a cathode solution comprising $H_2O$. A gaseous composition comprising at least 98% $H_2$ may be removed from the cathode chamber.

In one characterization, the fluid stream comprises a sodium salt. In another characterization, caustic soda is extracted from the cathode chamber. In another characterization, the method includes periodically sparging the anode chamber with air, and/or periodically sparging the cathode chamber with air. The method may also include the step of injecting a $CO_2$-containing gas into the cathode chamber to reduce the pH of the cathode solution.

In another characterization, the at least one microbial electrolysis cell comprises a cylindrical microbial electrolysis cell, wherein the anode, the cathode and the anion exchange membrane comprise substantially cylindrical bodies that are disposed in a substantially concentric relationship to form the cylindrical electrolysis cell, and wherein the anion exchange membranes operatively separate the anode chamber from the cathode chamber. In yet another characterization, the brush anodes are disposed on the outside of the cylindrical electrolysis cell whereby the anion exchange membranes operatively separates a single anode chamber from a plurality of cathode chambers configured within the plurality of cylindrical electrolysis cells.

DESCRIPTION

Disclosed herein are designs for a MEC that may achieve high current densities at relatively low applied voltages. The MEC may produce, at the cathode, a high purity $H_2$ gas stream (e.g., greater than 98% $H_2$) that can be directly used in energy-conversion applications or as a chemical precursor. Other useful chemical products may also be produced, such as caustic soda (NaOH).

Microbial electrolysis cell (MEC), as used herein, utilizes electrons produced at the anode for the purpose of generating chemical products at the cathode and not as a significant power source external to the MEC, such as is the case with a microbial fuel cell.

Figure 1:
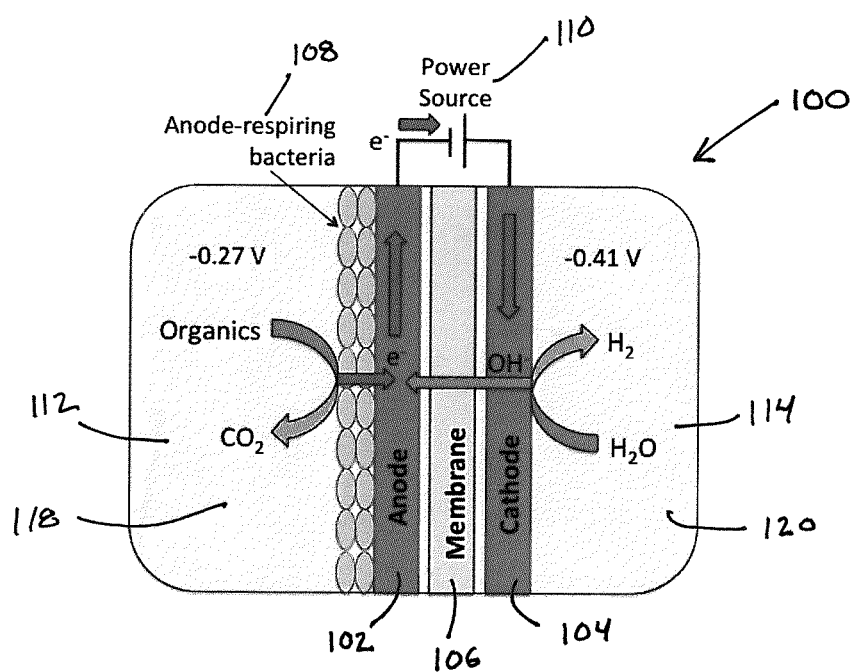
FIG. 1 illustrates a schematic representation of a microbial electrolysis cell (MEC).
Figure 2:
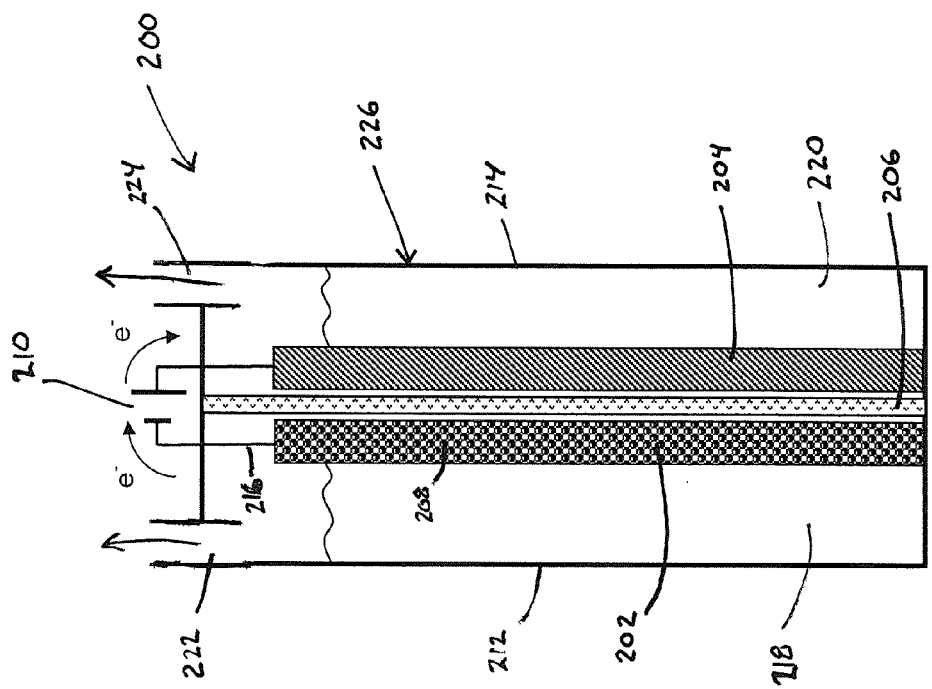
FIG. 2 illustrates a schematic representation of a MEC.

FIG. 2 illustrates a schematic representation of a MEC. The MEC includes a reaction chamber 226 that is operatively separated into an anode chamber 212 and a cathode chamber 214 by a membrane 206. The anode chamber 212 includes an anode 202 (e.g., a brush anode) disposed therein and the cathode chamber 214 includes a cathode 204 disposed therein. The anode chamber 212 and cathode chamber 214, and hence the anode 202 and the cathode 204, are separated by a membrane 206 (e.g., an anion exchange membrane). In particular, the membrane 206 may be of such a nature and may be configured within the reaction chamber 226 such that reaction products from chambers 212 and 214 cannot intermix.

The anode 202 may include anode-respiring bacteria 208 (e.g., *G. sulfurreducens*) disposed thereon. The anode 202 may be a three-dimensional, high surface area anode and in one embodiment is a brush anode. For example, the anode 202 may be a carbon brush anode. The anode 202 may also include a conductive wire 216 (e.g., a titanium or stainless steel conductor wire) to facilitate connection of the anode 202 to the power source 210 for the transport of electrons.

The cathode 204 may be a mesh cathode (e.g., a stainless steel mesh cathode) or the cathode 204 may comprise a metal foam (e.g., a nickel metal foam). The cathode may advantageously be very thin, such as having a thickness of not greater than about 5 mm, such as not greater than about 2 mm, and even not greater than about 1 mm.

As illustrated in FIG. 2, the electrolysis cell 200 comprises an anode 202, a cathode 204, and a membrane 206 that comprise substantially planar bodies that are disposed in a substantially co-planar relationship. During operation of the cell, an anode solution 218 may be disposed within the anode chamber 212 and a cathode solution 220 may be disposed within the cathode chamber 214. For example, the anode solution 218 may include organic matter (e.g., dissolved organic matter), such as a waste water stream (e.g., a standard domestic waste water). In this regard, the organics may be oxidized at the anode 202 by the anode-respiring bacteria 208, and an oxidized carbon gas species (e.g., $CO_2$) may be removed from the anode chamber 212 at an anode chamber outlet 222. Concurrently, a cathode solution 220 may be disposed within the cathode chamber 214, where the cathode solution is comprised mainly of $H_2O$. Thus, the $H_2O$ may be reduced at the cathode 204 and a gaseous composition comprising $H_2$ may be withdrawn from the cathode liquid chamber 214 at the cathode chamber outlet 224.

Figure 3:
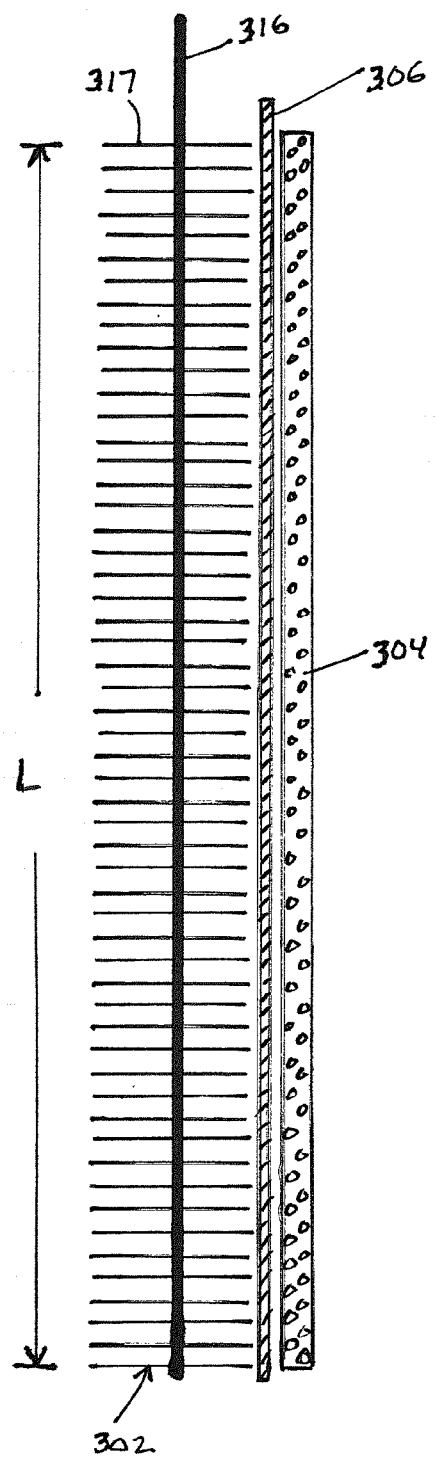
FIG. 3 illustrates a schematic view of an anode, a cathode and a membrane separating the anode and cathode.
Figure 4:
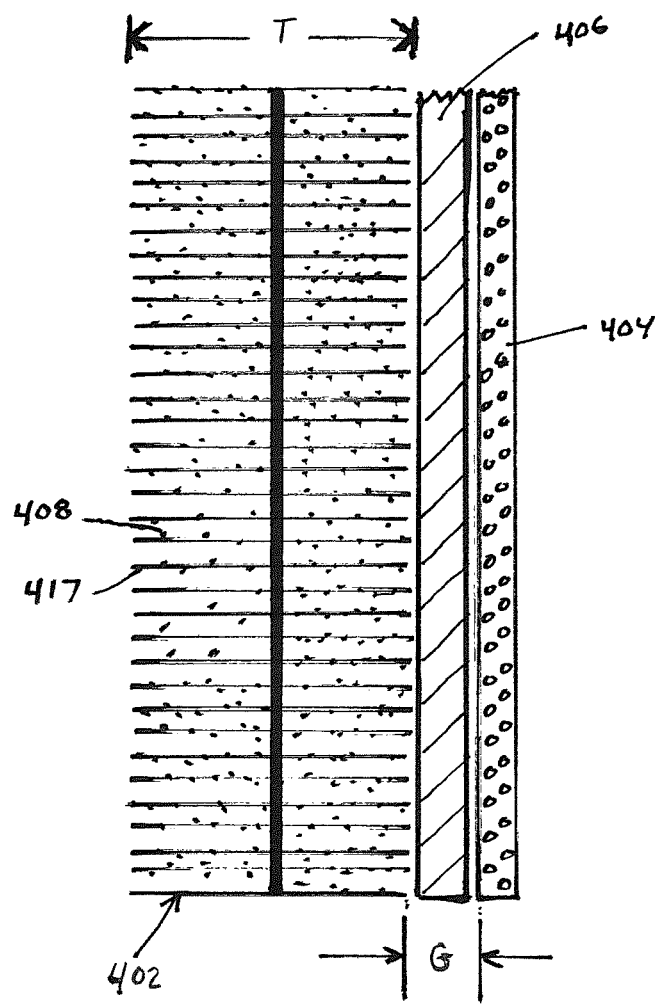
FIG. 4 illustrates a schematic view of an anode, a cathode and a membrane separating the anode and cathode.

FIGS. 3 and 4 illustrate schematic side views of a brush anode separated from a cathode by a membrane. Referring to FIG. 3, the brush anode 302 comprises a plurality of carbon brush fibers 317 emanating from a conductive wire 316 disposed approximately through the center of the anode 302 and substantially parallel to the surfaces of a membrane 306 and a cathode 304. The brush anode may advantageously have a length (L) of at least about 5 cm such as at least about 10 cm.

Referring now to FIG. 4, a portion of a brush anode 402, a membrane 406, and a cathode 404 are illustrated. The brush anode includes carbon brush fibers 417 and anode-respiring bacteria 408 disposed on the carbon brush fibers 417 throughout the thickness (T) of the brush anode 402. The thickness of the brush anode (e.g., the diameter) may be relatively small, to reduce Ohmic losses in the MEC. For example, the brush anode 402 may have a thickness of not greater than about 2.0 cm, such as not greater than about 1.5 cm, such as not greater than about 1.0 cm and even not greater than about 0.75 cm.

Further, the separation distance (G) between the tips of the carbon brush fibers 417 (e.g., the tips adjacent the membrane 406) and the surface of the cathode 404 (e.g., the surface adjacent to the membrane 406) may be significantly reduced. In one characterization, the separation distance (G) is not greater than about 1.25 cm, such as not greater than about 1.0 cm, not greater than about 0.9 cm, not greater than about 0.8 cm, not greater than about 0.7 cm, not greater than about 0.6 cm, not greater than about 0.5 cm, not greater than about 0.4 cm, and even not greater than about 0.3 cm. In a further characterization, the anode 402, the cathode 404, or both may be in physical contact with the membrane 406 along at least a portion of the length thereof. In this manner, the thickness of the membrane 406 will be the separation distance (G) between the anode and cathode. In one aspect, the thickness of the membrane is not greater than about 5 mm, such as not greater than about 1 mm.

Figures 5, 6:
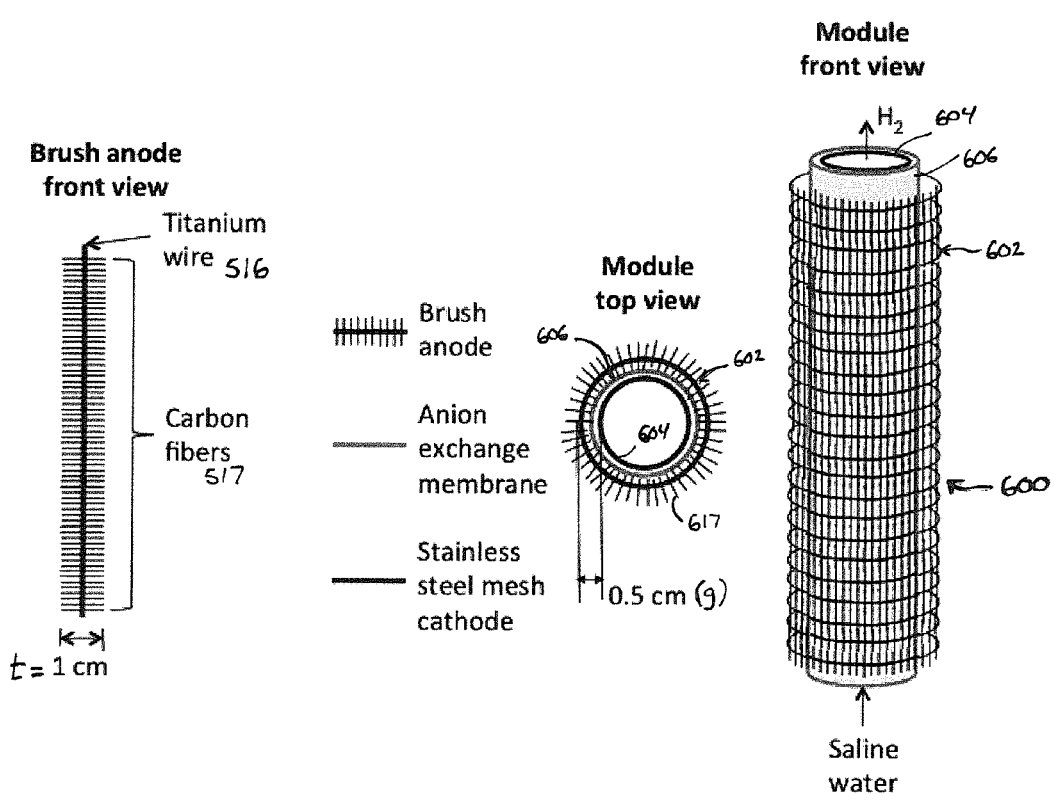
FIG. 5 illustrates a side (e.g. front) view of brush anode.
FIG. 6 illustrates a top view of and a perspective view of a MEC.

FIGS. 5 and 6 illustrate various facets of a MEC design according to another embodiment. The MEC illustrated in FIGS. 5 and 6 may advantageously reduce Ohmic losses, may produce high purity $H_2$ (e.g., >99% pure $H_2$), and/or may have high volumetric current densities and $H_2$ production rates. This MEC advantageously utilizes cylindrical bodies (e.g., cylindrical bodies of the anode, cathode and membrane) that are disposed in substantially concentric relationship to form a cylindrical electrolysis cell and increase the efficiencies of the MEC.

In the MEC 600 illustrated in FIG. 6, the brush anode 602 may be wound around (e.g., onto) the cylindrical assembly of a membrane 606 and a cathode 602 along its length. The length of the cylindrical assembly 600 may be selected as per the requirements for treatment and $H_2$-production performance.

The AEM 606 is rolled over a cylindrical stainless steel mesh that acts as the cathode 604. A 316-grade stainless steel mesh may be used for the cathode 604 in the present MEC design, but any grade stainless steel may be used as long as it has appreciable nickel content. Carbon cloths coated with nickel or other metal catalyst powders can also be used in the MEC 600.

Other materials that are comparable in cost to stainless steel, may be used for the cathode 604. For example, a nickel mesh or a metal foam (e.g., a nickel metal foam) may be used in the form of hollow cylinders. This nickel mesh or metal foam should be relatively thin to minimize Ohmic losses, and may advantageously have a thickness of not greater than about 5 mm, such as not greater than about 2 mm, or even not greater than about 1 mm.

As is discussed with respect to FIGS. 3 and 4, the MEC 600 may utilize a relatively short separation distance between the anode 602 and the cathode 604 to reduce Ohmic losses. As used herein, the separation distance is measured from outer surface to outer surface, e.g., from the tips of the anode brush to the surface of the cathode mesh. See FIG. 4. The separation distance may be not greater than about 1.5 cm, such as not greater than about 1.25 cm, or even not greater than about 1.0 cm. In one characterization, the separation distance is approximately 0.5 cm. For a 100-mM PBS (phosphate buffer solution), which has conductivity of 14 mS/cm, a distance of 3 cm between the anode and the cathode, as typically used in current MEC designs, results in an Ohmic loss of 0.42 V at 20 $A/m^2$, while the Ohmic loss in the disclosed MEC configuration having 0.5 cm separation distance may be reduced to as low as 0.07 V.

As discussed above, an AEM may advantageously be used in the MEC design to separate the anode and the cathode. When a membrane (e.g., an AEM) is used to separate the anode and the cathode, a pH gradient develops and results in additional losses of potential. While a pH gradient exists when using an AEM, the cathode pH is lower and additional methods to mitigate the cathode pH (e.g., $CO_2$ addition to the cathode) may also be utilized.

Figure 7:
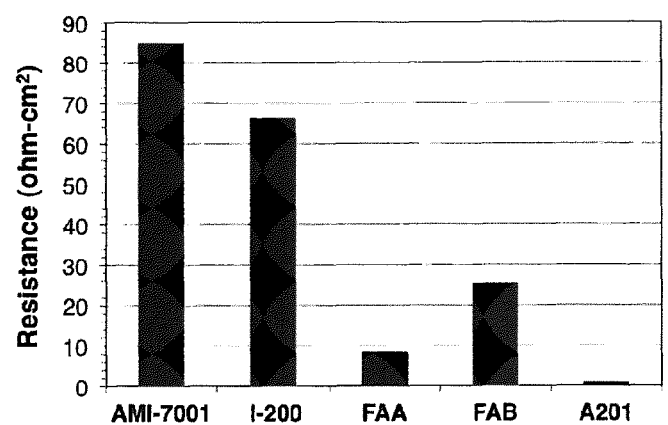
FIG. 7 illustrates the comparative Ohmic losses of several different anion exchange membranes used in a MEC.

An AEM sold under the trade name AMI-7001 (Membranes International, Ringwood N.J., USA) is believed to be the most widely used AEM in MECs. AMI-7001 is a strong base anion exchange membrane utilizing quaternary ammonium as a functional group. However, is has been discovered that this membrane introduces too much loss in an MEC due to its resistance to ion flow. Five AEMs are evaluated for the present MEC design. The resistance that each provides to ion flow in 100-mM phosphate buffer solution (PBS) is illustrated in FIG. 7. As it gives the best performance, the A201 membrane (Tokuyama Corp., Tokyo, JP) may advantageously be utilized in the disclosed MEC design. This membrane is a hydrocarbon polymer membrane containing quaternary ammonium moieties.

The MECs disclosed herein may provide high operating efficiencies when used to treat fluid streams containing organic matter (e.g., wastewater fluid streams) and produce a gas composition comprising $H_2$ gas. More specifically, relatively low applied voltages may be utilized to provide relatively high current densities in the cell. In one aspect, the applied voltage (i.e., across the anode and the cathode) is not greater than about 1.2 V, and the resulting volumetric current density is at least about 500 $A/m^3$, such as at least about 600 $A/m^3$ or even at least about 750 $A/m^3$.

The present MEC designs may provide other important advantages. One is the ability to collect pure $H_2$ at the cathode. In one aspect, the gas composition withdrawn from the cathode chamber comprises at least 95% $H_2$, such as at least 98% $H_2$, at least 98.5% $H_2$, at least 99% $H_2$, at least 99.5% $H_2$ or even at least 99.9% $H_2$. A second advantage is that the membrane creates a significant resistance to diffusion of $H_2$ across to the anode, and this reduces $H_2$ loss to biological activity at the anode. Scaled-up MECs not containing a membrane have shown poor $H_2$ recovery caused by extensive $CH_4$ formation as a result of $H_2$ consumption by methanogens. The MEC designs disclosed herein may substantially preclude this problem. In one aspect, the gas composition withdrawn from the cathode chamber comprises substantially no $CH_4$ (e.g., not greater than 0.1% $CH_4$). Methane production, however, may still occur at the anode, from acetate (Ac⁻) and $H_2$ produced from fermentation reactions, and this diverts electrons away from electrical current, and ultimately decreases $H_2$ production. Thus, periodical sparging of the anode chamber with air or other $O_2$-containing gas may be implemented, for operation at large scale. This curbs the growth of methanogens, as they are severely inhibited by $O_2$, while dominant ARB such as those belonging to the *Geobacter* genus are reported to tolerate $O_2$ to certain extent. In the unlikely event of methanogenesis at the cathode, a similar strategy could also be applied to the cathode to limit methane formation.

Figure 8:
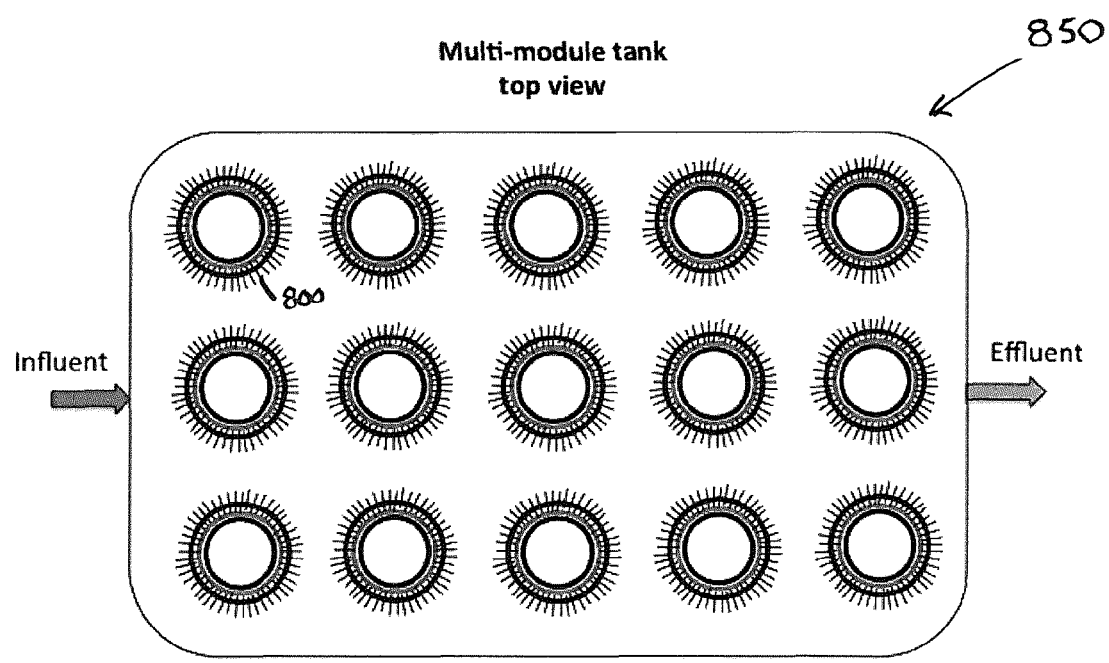
FIG. 8 illustrates a top view of a multi-module MEC tank.

While a single MEC module is described above, a multi-module apparatus may be assembled to achieve wastewater treatment at flows typically generated by industries or municipalities. Scaling may be achieved by using multiple modules. FIG. 8 illustrates a design of a multi-module MEC treatment tank 850 that is capable of a high volumetric treatment rate. The tank 850 may consist of several modules 800 of the anode, membrane and cathode configuration described above (e.g., FIG. 6). The height and diameter of the individual modules 800, and the distance between any two modules can be selected as per the requirement for treatment performance, as long as within a single module 800 the effective distances between the anode and the cathode are maintained as is disclosed above.

In addition to high purity hydrogen, caustic soda (NaOH) may be produced in the current MEC designs. The present MEC designs will allow the production of caustic soda at high rates, but with lower applied voltages. Caustic soda is produced in MECs via the formation of $OH^-$ at the cathode from the water reduction reaction, and the transfer of $Na^+$ from the anode to the cathode through a cation exchange membrane. Although an AEM is typically used in the MECs disclosed herein, caustic soda can still be produced if NaCl is added to the cathode solution. In this case, the $Cl^-$ ions move from the cathode to the anode, leaving behind $Na^+$ that combine with $OH^-$. The MECs disclosed herein reduces Ohmic losses, thus allowing for faster ion movement and thus higher rates of caustic production at a given applied voltage.

In summary, the MECs disclosed herein and the methods disclosed herein advantageously enable a scalable technology that may be optimized for the low-energy treatment of organic materials such as in wastewaters. The wastewaters may be domestic wastewaters or may be industrial wastewaters such as those that are common to the food and beverage processing industries. For example, the wastewater may be an industrial wastewater from a potato treatment plant (e.g., in the manufacture of potato snacks), breweries, wineries, confectioneries, dairies, fruit processing plants, frozen dinner product plants, soy product plants, grain processing plants and pulp and paper manufacturing plants. The methods may use about 70% less electricity and produce about 80% less solid sludge as compared to aeration methods for the treatment of wastewater, while delivering identical or improved treatment performance. Hydrogen generated by the method may be used as a versatile commodity chemical or as a carbon-free energy source. Caustic soda as a byproduct may also be used in many food and beverage production plants. The MEC is advantageously low-maintenance, energy efficient and may be assembled without the use of exotic materials. The MECs may advantageously provide a high-surface area for bacterial growth, translating into efficient contaminant breakdown in the wastewater stream. The MECs are easily scaled to treat high volumes of wastewater.

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A microbial electrolysis cell, comprising:
   a high surface-area brush anode comprising a plurality of brush fibers emanating from a conductive wire;
   a cathode;
   a power source operatively connected to the brush anode and the cathode;
   an anion exchange membrane separating the brush anode from the cathode, wherein the cathode and the anion exchange membrane form a substantially cylindrical assembly and wherein the brush anode is spirally wound onto the cylindrical assembly to form a substantially cylindrical electrolysis cell; and
   a reaction chamber containing the substantially cylindrical electrolysis cell,
   wherein a separation distance between the brush anode and the cathode is not greater than about 1.5 cm, and wherein the anion exchange membrane operatively separates the reaction chamber into an anode chamber containing the brush anode and a cathode chamber containing the cathode.

2. The microbial electrolysis cell of claim 1, wherein the brush anode comprises a plurality of brush fibers emanating from a conductive wire disposed approximately through the center of the anode, wherein the brush fibers comprise carbon fibers and the conductive wire comprises stainless steel.

3. The microbial electrolysis cell of claim 1, wherein the cathode comprises a metal foam.

4. The microbial electrolysis cell of claim 3, wherein the metal foam has a thickness not greater than about 5 mm.

5. The microbial electrolysis cell of claim 1, wherein the cathode comprises nickel metal foam.

6. The microbial electrolysis cell of claim 1, wherein the separation distance between the brush anode and the cathode is not greater than about 1.25 cm.

7. The microbial electrolysis cell of claim 1, wherein the brush anode has a thickness of not greater than about 2.0 cm.

8. The microbial electrolysis cell of claim 1, wherein the brush anode has a length, wherein the brush anode is in direct physical contact with the anion exchange membrane along at least a portion of its length.

9. The microbial electrolysis cell of claim 1, wherein the cathode is in direct physical contact with the anion exchange membrane.

10. The microbial electrolysis cell of claim 1, wherein the anion exchange membrane is a hydrocarbon polymer membrane comprising quaternary ammonium moieties.

11. A multi-module microbial electrolysis cell treatment apparatus, comprising:
    a treatment tank having an inlet for influent and an outlet for effluent; and
    a plurality of cylindrical microbial electrolysis cells operatively disposed within the treatment tank, the microbial electrolysis cells comprising:
    a high surface-area brush anode comprising a plurality of brush fibers emanating from a conductive wire;
    a cathode;
    a power source operatively connected to the brush anode and the cathode; and
    an anion exchange membrane separating the brush anode from the cathode,
    wherein the cathode and the anion exchange membrane form a substantially cylindrical assembly and wherein the brush anode is spirally wound onto the cylindrical assembly to form the cylindrical microbial electrolysis cells, wherein a separation distance between the brush anode and the cathode is not greater than about 1.5 cm and wherein the anion exchange membrane operatively separates the influent from the effluent in the treatment tank.

12. The multi-module microbial electrolysis cell treatment apparatus of claim 11, wherein the anion exchange membrane is a hydrocarbon polymer membrane comprising quaternary ammonium moieties.

* * * * *